United States Patent
Li et al.

(10) Patent No.: US 8,037,053 B2
(45) Date of Patent: Oct. 11, 2011

(54) SYSTEM AND METHOD FOR GENERATING AN ONLINE SUMMARY OF A COLLECTION OF DOCUMENTS

(75) Inventors: Xin Li, Sunnyvale, CA (US); Eric Zhao, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 386 days.

(21) Appl. No.: 12/263,368

(22) Filed: Oct. 31, 2008

(65) Prior Publication Data

US 2010/0114859 A1    May 6, 2010

(51) Int. Cl.
*G06F 7/00* (2006.01)

(52) U.S. Cl. ........................................ 707/709

(58) Field of Classification Search .................. 707/705, 707/706, 722, 758, 709; 704/10
See application file for complete search history.

(56) References Cited

U.S. PATENT DOCUMENTS

| | | | |
|---|---|---|---|
| 5,325,298 A * | 6/1994 | Gallant | 704/9 |
| 7,146,361 B2 * | 12/2006 | Broder et al. | 707/769 |
| 7,523,103 B2 * | 4/2009 | Goel et al. | 1/1 |
| 2005/0086224 A1 * | 4/2005 | Franciosa et al. | 707/6 |
| 2007/0067157 A1 * | 3/2007 | Kaku et al. | 704/10 |
| 2008/0114751 A1 * | 5/2008 | Cramer et al. | 707/5 |
| 2008/0243842 A1 * | 10/2008 | Liang et al. | 707/6 |
| 2008/0306943 A1 * | 12/2008 | Patterson | 707/6 |

* cited by examiner

*Primary Examiner* — Hung T Vy
(74) *Attorney, Agent, or Firm* — Buchenhorner Patent Law

(57) ABSTRACT

An improved system and method for generating an online summary of a collection of documents is provided. A list of documents may be received, and the titles of the list of documents may be obtained. A set of terms that frequently occur in the titles of the documents may be iteratively expanded and overlapping phrases may be merged until there may be no more terms that occur in the titles with a frequency that exceeds a predefined threshold. In an embodiment, an article summarizer operably coupled to a search engine may be provided to generate a summary of a list of references to web pages in search results using titles of the web pages. The summary of the web pages may then be sent with the list of references to the web pages as search results to a client device for display to a user.

19 Claims, 5 Drawing Sheets

SYSTEM AND METHOD FOR GENERATING AN ONLINE SUMMARY OF A COLLECTION OF DOCUMENTS

FIELD OF THE INVENTION

The invention relates generally to computer systems, and more particularly to an improved system and method for generating an online summary of a collection of documents.

BACKGROUND OF THE INVENTION

Current search technology may display a search results page that lists multiple websites with relevant information for a search query submitted by a user. In order to find desired content for the search query, a user may select a website to view the content. If the website does not present the desired content, a user may continue to select other websites to view the content or submit another search query to receive a search results page with a different listing of websites to view. Frequently, users experience frustration in finding desired content when too many websites are viewed in order to find desired content and when several search queries need to be submitted to find desired content. Although functional, finding the content desired for many search queries presents a challenging task when using the current search technology.

From a user perspective, search engines may often return poor results for certain search queries. Although user interfaces for search queries may explicitly or implicitly expand search terms to help, users often learn good search terms for the desired content by iteratively submitting search terms and receiving results. Such a cyclical process of trial and error can be very inefficient and discouraging for many users. Unfortunately, the capability to effectively and efficiently summarize the subject matter of search results is lacking. Instead, users are commonly presented with pages and pages of search results that represent an overwhelming space of results to be explored to find desired content. Exploring such a potentially immense results space by iteratively selecting websites to view the content is a rudimentary and cumbersome.

What is needed is a way for a user to efficiently filter search results of a search query and more effectively find the content desired. Such a system and method should support a capability for users to understand an overview of the subject matter of search results in order to more effectively and efficiently find the desired results.

SUMMARY OF THE INVENTION

The present invention provides a system and method for generating an online summary of a collection of documents. In general, a list of documents may be received, and the titles of the list of documents may be obtained. A set of terms that frequently occur in the titles of the documents may be iteratively expanded and overlapping phrases may be merged until there may be no more terms that occur in the titles with a frequency that exceeds a predefined threshold. And an online summary of the documents generated using the titles of the documents may be output. In an embodiment, an article summarizer operably coupled to a search engine may be provided to generate a summary of a list of references to web pages in search results. A search query may be received by a search engine to obtain a list of references to web pages as search results, and the search engine may obtain a list of references to web pages as search results. The list of references to web pages may be summarized using titles of the web pages, and the summary of the web pages may then be sent with the list of references to the web pages as search results to a client device for display to a user.

To generate an online summary of a list of documents, titles for a collection of documents may be obtained. A seed set of terms may be chosen as an initial set of terms from the titles of the collection of documents. The seed set of terms may be expanded with adjacent terms that appear in each of the titles and overlapping or duplicate phrases may be merged to eliminate redundancy. The method may iteratively expand the set of terms and merge overlapping phrases until there may be no more terms that occur in the titles with a frequency that exceeds a predefined threshold. Then grammar rules for the language may be applied, for instance, to remove a term at the beginning or the end of a summary phrase that should not appear in that position of a sentence in the given language. And the summary of the titles of the collection of documents may be output with the list of documents.

The present invention may support many applications for generating a summary of a collection of documents. For example, online search applications may use the present invention to generate a summary of a collection of web pages referenced in a list of search results. Or the present invention may be used by a directory services application for listing a collection of documents in a document storage system. Similarly, the present invention may be used to summarize directories or a folder with stored documents on a storage device of a computer. For any of these applications, a summary of a collection of documents may be generated by the present invention using descriptive information of each document.

Other advantages will become apparent from the following detailed description when taken in conjunction with the drawings, in which:

DETAILED DESCRIPTION

Exemplary Operating Environment

Figure 1:
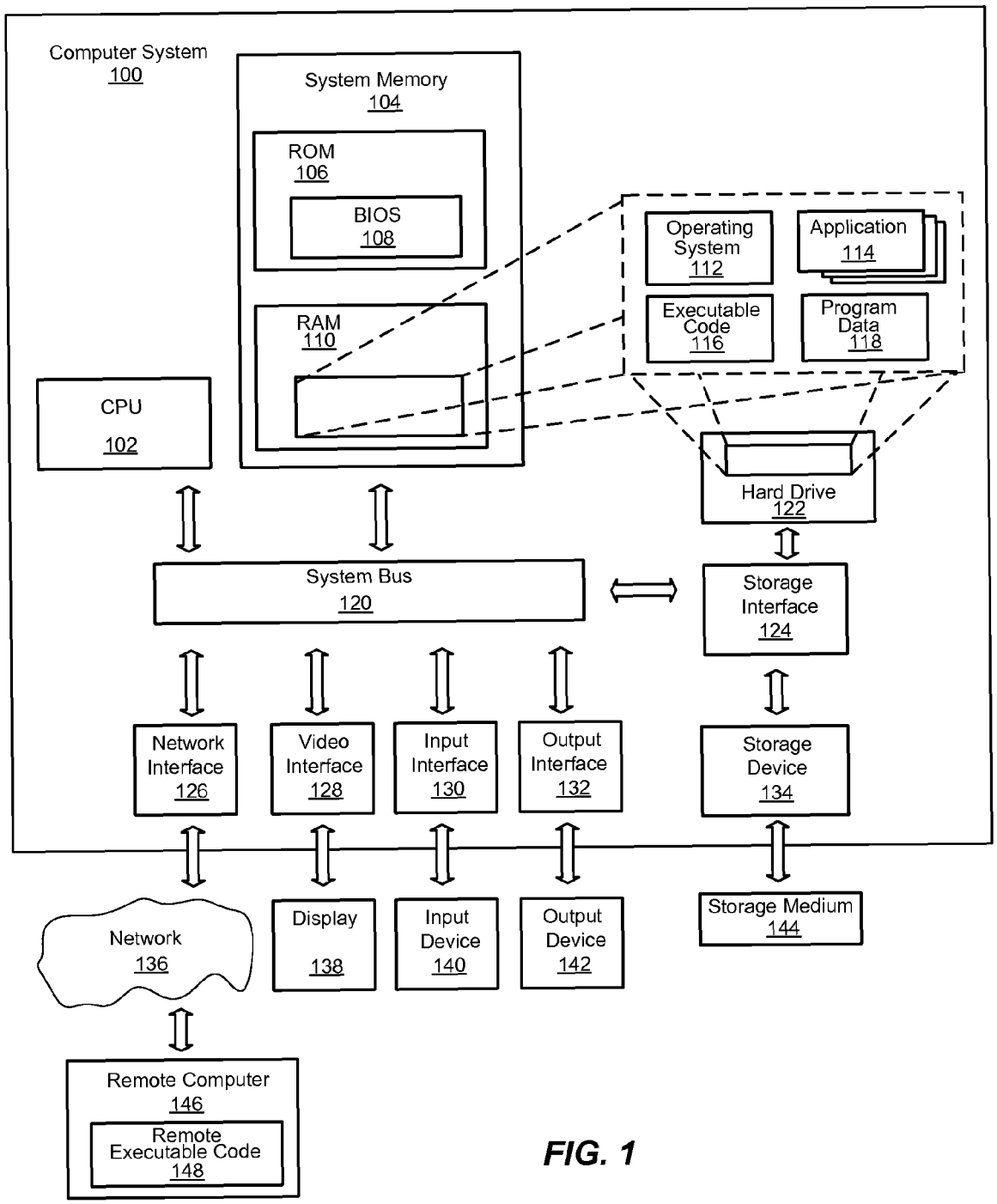
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

Generating an Online Summary of a Collection of Documents

The present invention is generally directed towards a system and method for generating an online summary of a collection of documents. A list of documents may be retrieved, and the titles of the list of documents may be obtained. A set of terms that frequently occur in the titles of the documents may be iteratively expanded and overlapping phrases may be merged until there may be no more terms that occur in the titles with a frequency that exceeds a predefined threshold. And an online summary of the documents generated using the titles of the documents may be output. In an embodiment, an article summarizer operably coupled to a search engine may be provided to generate a summary of a list of references to web pages in search results using titles of the web pages. The summary of the web pages may then be sent with the list of references to the web pages as search results to a client device for display to a user.

As will be seen, the present invention may support many applications for generating a summary of a collection of documents. For example, online search applications may use the present invention to generate a summary of a collection of web pages referenced in a list of search results. Or the present invention may be used by a directory services application for listing a collection of documents in a document storage system. Similarly, the present invention may be used to summarize directories or a folder with stored documents on a storage device of a computer. As will be understood, the various block diagrams, flow charts and scenarios described herein are only examples, and there are many other scenarios to which the present invention will apply.

Figure 2:
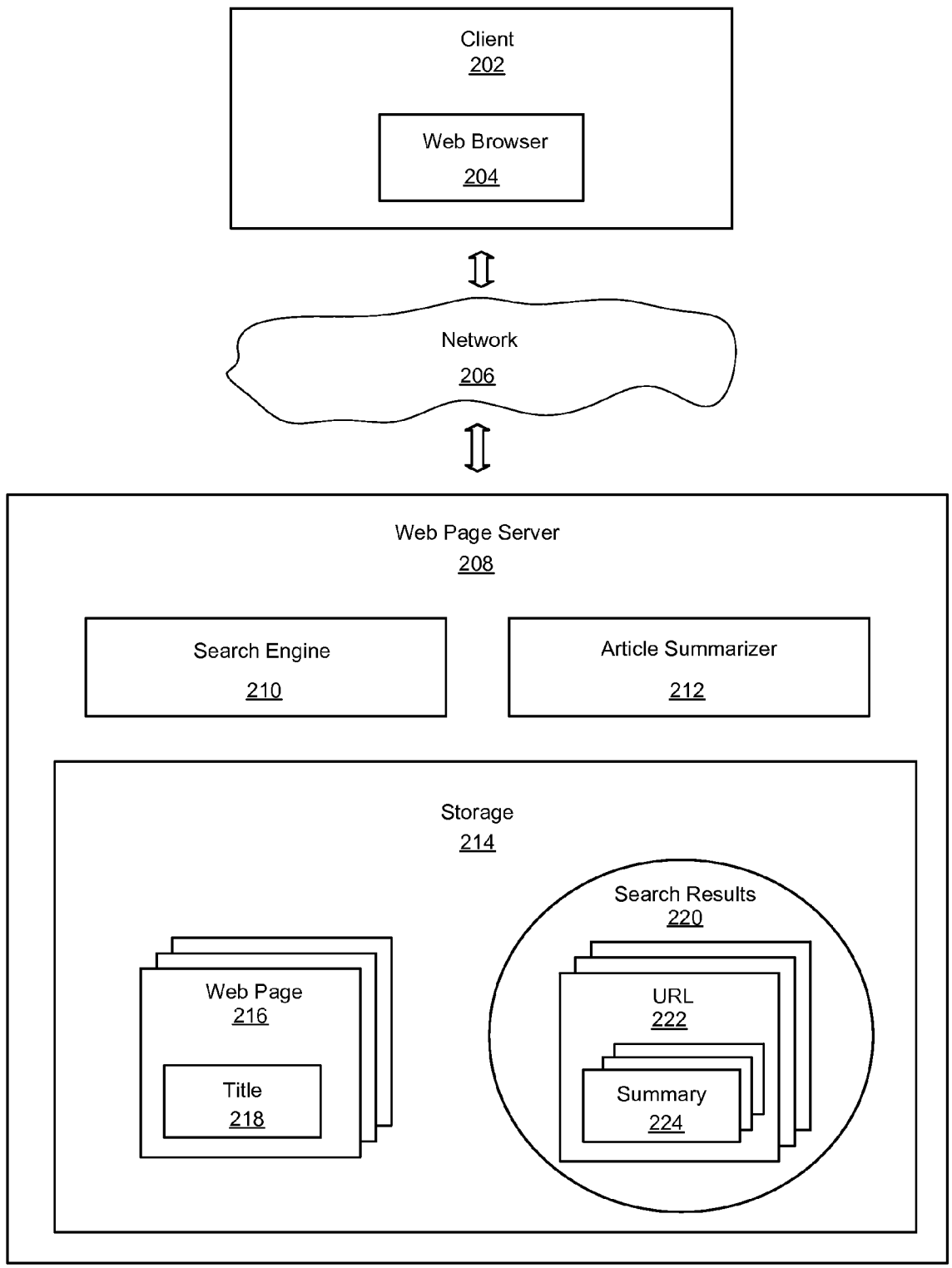
FIG. 2 is a block diagram generally representing an exemplary architecture of system components for generating an online summary of a collection of documents, in accordance with an aspect of the present invention.

Turning to FIG. 2 of the drawings, there is shown a block diagram generally representing an exemplary architecture of system components for generating an online summary of a collection of documents. Those skilled in the art will appreciate that the functionality implemented within the blocks illustrated in the diagram may be implemented as separate components or the functionality of several or all of the blocks may be implemented within a single component. For example, the functionality for the article summarizer 212 may be included in the same component as the search engine 210. Or the functionality of the article summarizer 212 may be implemented as a separate component from the search engine 210 as shown. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 208 by a network 206. The client computer 202 may be a computer such as computer system 100 of FIG. 1. The network 206 may be any type of network such as a local area network (LAN), a wide area network (WAN), or other type of network. A web browser 204 may execute on the client computer 202 and may include functionality for receiving a search request which may be input by a user entering a query and functionality for sending the query request to a server to obtain a list of search results. In general, the web browser 204 may be any type of interpreted or executable software code such as a kernel component, an application program, a script, a linked library, an object with methods, and so forth.

The web page server 208 may be any type of computer system or computing device such as computer system 100 of FIG. 1. In general, the web page server 208 may provide services for processing a search query and may provide services for returning search results from processing a search query. In particular, the web page server 208 may include a search engine 210 for finding search results for a search query and an article summarizer 212 for generating a summary of a collection of documents, such as web pages listed in search results, using the titles of the documents in the collection. The article summarizer 212 may use descriptive information about each document such as the title, and/or other descriptive information about the document. Each of these modules may also be any type of executable software code such as a kernel component, an application program, a linked library, an object with methods, or other type of executable software code.

The web page server 208 may be operably coupled to storage 214 that may include a collection of documents such as web pages 216, each with an associated title 218. In an embodiment, the web pages may be represented as HTML document that includes a title field that may store a document title. The title of an HTML document may also be marked by HTML tags, such as tags <h1> . . . </h1> which usually represents the title of a web page. Storage 214 that may also include search results 220 with references such as a Uniform Resource Locator (URL) 222 to web pages and a summary of a collection of web pages 224.

Those skilled in the art will also appreciate that many of the components of the computer system 100 and the system components for generating an online summary of a collection of documents illustrated in FIG. 2 may be implemented in various embodiments within a system-on-a-chip architecture including memory, external interfaces, the operating system, the search engine and the social information ranking engine. System-on-a-chip implementations are common for special purpose hand-held devices, such as mobile phones, digital music players, personal digital assistants and the like.

There may be many applications which may use the present invention for generating a summary of a collection of documents. For example, online search applications may use the present invention to generate a summary of a collection of web pages referenced in a list of search results. Or the present invention may be used by a directory services application for listing a collection of documents in a document storage system. Similarly, the present invention may be used to summarize directories or folder with stored documents on a storage device of a computer. For any of these applications, a summary of a collection of documents may be generated by the present invention using descriptive information of each document.

Figure 3:
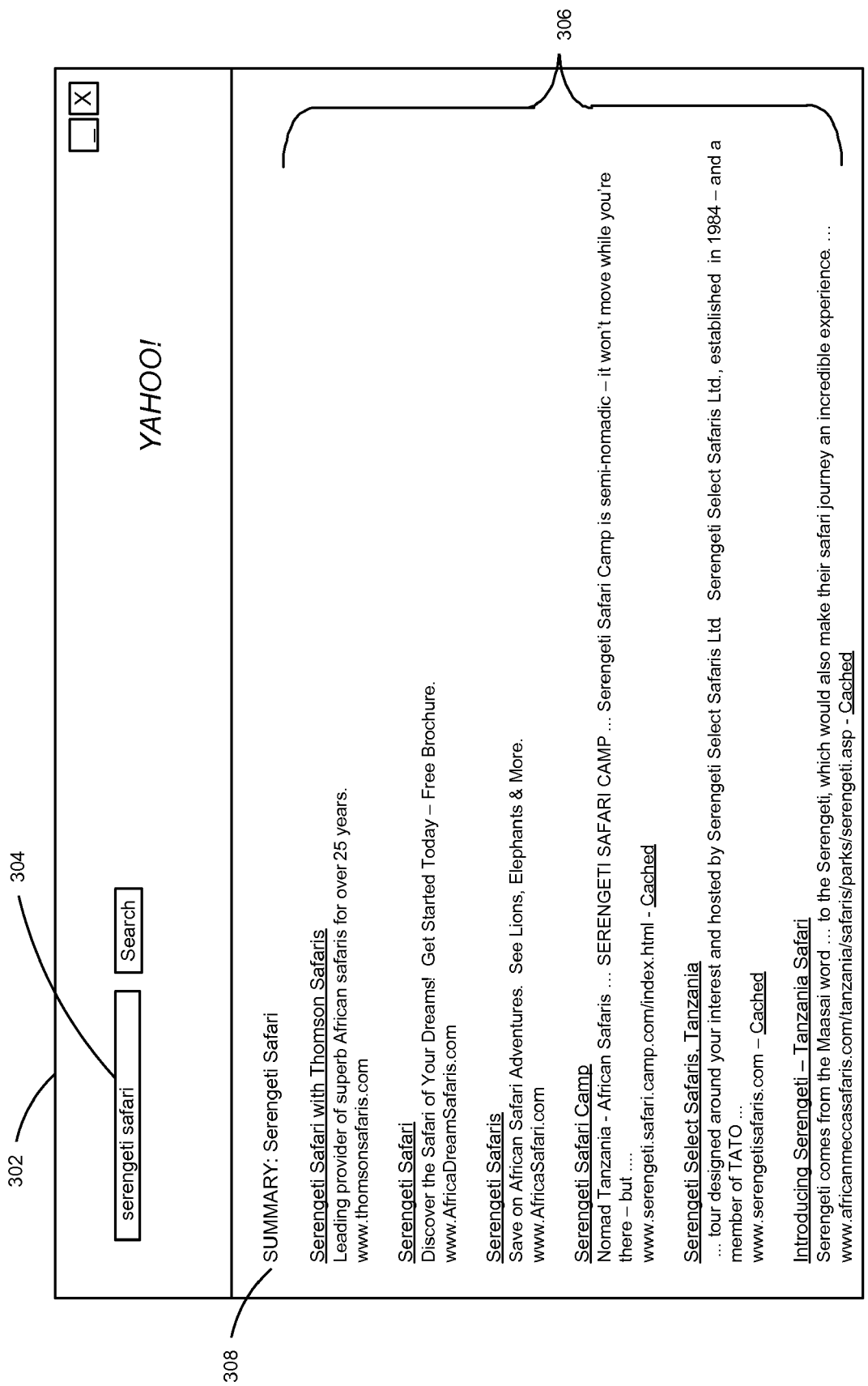
FIG. 3 presents an illustration that depicts in an embodiment a search results page with references to web pages and a summary of the web pages that may be displayed by a web browser running on a client device, in accordance with an aspect of the present invention.

FIG. 3 depicts in an embodiment a search results page with references to web pages and a summary of the web pages that may be displayed by a web browser running on a client device. A display of a web browser 302 is illustrated in FIG. 3 for a search results page and may include a text input field 304 so a user may enter a search query such as "serengeti safari". In the embodiment illustrated in FIG. 3 for example, search results such as the list of URLS with descriptive text 306 may be displayed in the search results page and a summary of the web pages 308 referenced in the list of URLs may also be displayed in the search results page as shown. In an embodiment, the summary of the web pages 308 referenced in the list of URLs may represent a summary of the list of URLs displayed on the first search results page. In various embodiments, the summary may also represent a summary of a list of URLs displayed on subsequent search results pages.

Figure 4:
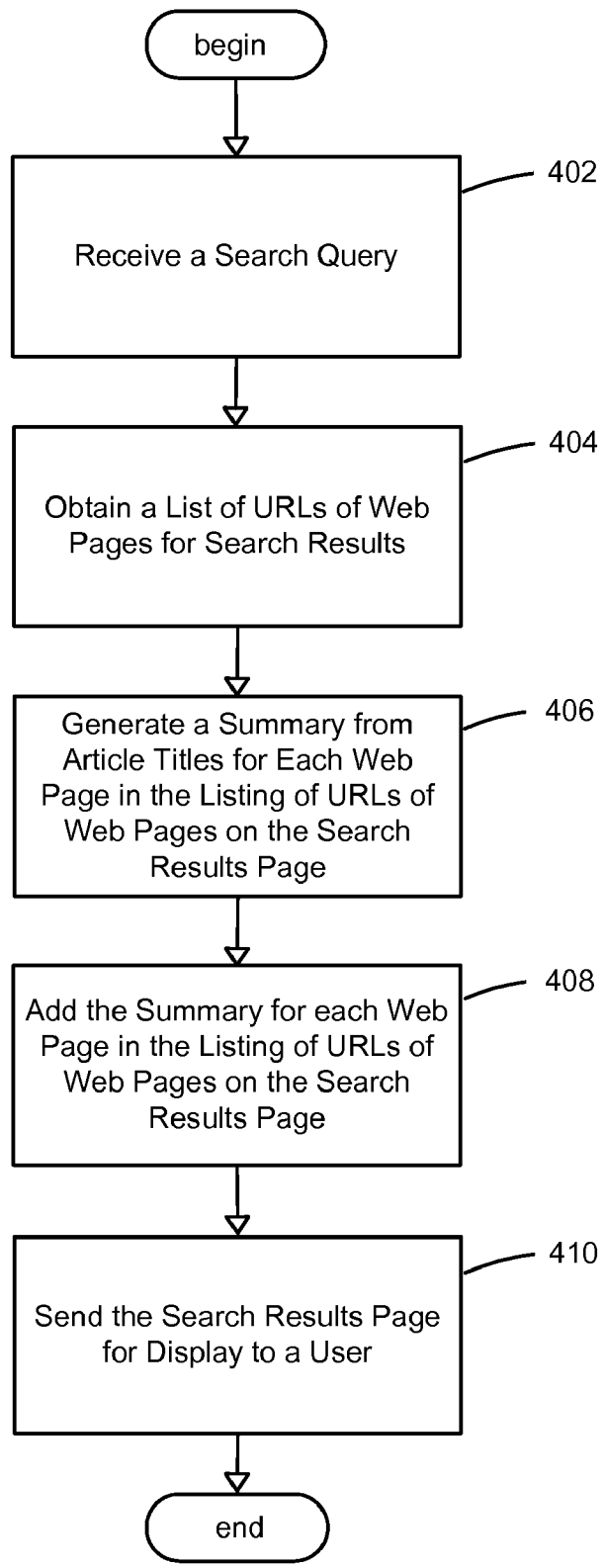
FIG. 4 is a flowchart generally representing the steps undertaken in one embodiment for generating a summary of a collection of documents, in accordance with an aspect of the present invention.

FIG. 4 presents a flowchart for generally representing the steps undertaken in one embodiment for generating a summary of a collection of documents. At step 402, a search query may be received for processing, for instance, by a search engine. At step 404, a list of URLs for web pages may be obtained for search results. A summary may be generated at step 406 from web page titles obtained from each web page in the list of URLs for web pages on the search results page. At step 408, the summary for the web pages in the listing of URLs of web pages may be added to the search results page. And at step 410, the search result page with the added summary for web pages referenced may be sent for display to a user.

Figure 5:
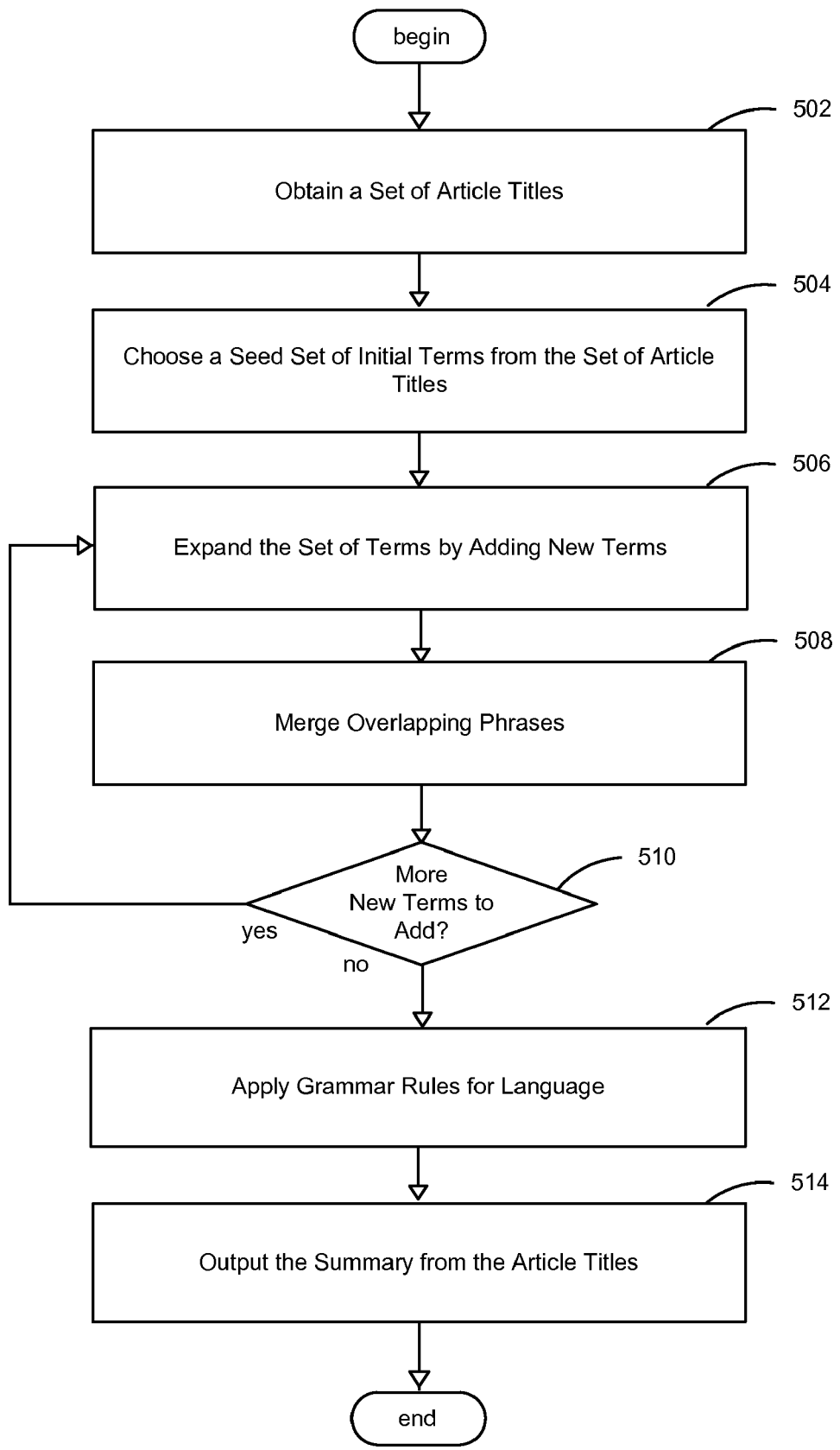
FIG. 5 is a flowchart generally representing the steps undertaken in one embodiment for generating a summary from document titles such as web page titles for references to web pages listed on a search results page, in accordance with an aspect of the present invention.

FIG. 5 presents a flowchart for generally representing the steps undertaken in one embodiment for generating a summary from document titles such as web page titles for references to web pages listed on a search results page. At step 502, titles for a collection of documents may be obtained. For example, an author of a web blog may provide a title for a web document that appears in a search results list of references to web pages. Or descriptive information such as header fields marked with HTML tags <h1> . . . </h1>, for example, in an HTML document may be extracted and used as one or more titles for a web document.

At step 504, a seed set of terms may be chosen as an initial set of terms from the titles of the collection of documents. In an embodiment, a term that appears frequently in the titles of the collection of documents may be selected. For example, a term that appears more than 10 times in the titles of the collection of documents may be chosen. After choosing the seed set of terms as an initial set of terms from the titles of the collection of documents, the set of terms may be expanded at step 506. In an embodiment, the set of terms may be expanded with adjacent terms that appear in each of the titles. For example, the adjacent terms for each term in the set of terms may be collected. If there may exists an adjacent term that appear in most of the titles, for instance 70% of the titles, then the set of terms may be expanded into phrases by concatenating terms in the set of terms with adjacent terms that appears in most of the titles. In an embodiment, a term may remain in its relative position in the set of terms when it is expanded into a phrase by concatenation with an adjacent term that appears in most of the titles.

And at step 508, overlapping phrases or sequences of terms may be merged to eliminate redundancy. For instance, if the phrases formed from two different seeds overlap, the two phrases may be merged into a single one. There are cases, where the same phrase appears at different positions in different titles. In this case, the weighted position of each phrase may be computed, i.e. the probability that the same phrase appear at different positions, and then the position with the greatest probability may be selected as the final position of a phrase in the summary. Those skilled in the art will appreciate that other ways can be used to decide the final position based on the probabilities at various position, such as weighted sum, median, and so on.

At step 510, it may be determined whether there may be any more new words occurring frequently in the titles that may be added to the set of terms. If so, then processing may continue at step 506 where the set of terms may be expanded by adding new terms. Otherwise, if there may not be any more new words occurring frequently in the titles that may be added to the set of terms at step 510, then grammar rules for the language may be applied at step 512. For instance, if there may be a term at the beginning or the end of a summary phrase that should not appear in that position of a sentence in the given languages, then the term may be moved or dropped to correct the grammar of the summary phrase. And at step 514, the summary of the titles of the collection of documents may be output.

By using descriptive information of each document, the present invention may provide an overview of the subject matter of documents in search results. Advantageously, the system and method may assist a user to filter search results of a search query in order to more effectively and efficiently find relevant search results. In addition, the user experience may improve in many online search applications. Importantly, the system and method may apply to different types of rich media content, including video, audio, and text authored by users.

As can be seen from the foregoing detailed description, the present invention provides an improved system and method for generating an online summary of a collection of documents. A list of documents may be received, and the titles of the list of documents may be obtained. A set of terms that frequently occur in the titles of the documents may be iteratively expanded and overlapping phrases may be merged until there may be no more terms that occur in the titles with a frequency that exceeds a predefined threshold. In an embodiment, a summary of a list of references to web pages in search results may be generated using titles of the web pages. The summary of the web pages may then be sent with the list of references to the web pages as search results to a client device for display to a user. Many applications may use the present invention for generating a summary of a collection of documents using descriptive information of each document, including online search applications to generate a summary of a collection of web pages referenced in a list of search results. As a result, the system and method provide significant advantages and benefits needed in contemporary computing, and more particularly in online search applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for generating an online summary of documents, comprising:
   a central processing unit configured to process information as:
   a search engine that receives a search query and obtains a list of URLs of web pages as search results;
   an article summarizer operably coupled to the search engine to generate an online summary of the list of URLs of web pages using a plurality of titles of the web pages;
   a web page storage operably coupled to the article summarizer that stores the online summary and the list of URLs of web pages as search results;
   merging overlapping phrases until there may be no more terms that occur in titles with a frequency that exceeds a predefined threshold; and
   applying grammar rules for a language in which the information is expressly merging overlapping phrases until there may be no more terms that occur in the titles with a frequency that exceeds a predefined threshold used to remove a term at the beginning or end of a phrase that should not appear in that position of a sentence in the given language.

2. The system of claim 1 further comprising a web browser operably coupled to the search engine to display the online summary and the list of URLs of web pages.

3. A computer-implemented method for generating an online summary of documents, comprising:
    using a central processing unit configured to process information for:
    receiving a search query to obtain a list of URLs of web pages as search results;
    obtaining the list of URLs;
    using an article summarizer generating an online summary of the list of the URLs using a plurality of titles of the web pages;
    using a web page storage operably coupled to the article summarizer for storing the online summary and the list of URLs of web pages as search results;
    merging overlapping phrases until there may be no more terms that occur in the titles with a frequency that exceeds a predefined threshold; and
    applying grammar rules for a language in which the information is expressly merging overlapping phrases until there may be no more terms that occur in the titles with a frequency that exceeds a predefined threshold used to remove a term at the beginning or end of a phrase that should not appear in that position of a sentence in the given language.

4. The method of claim 3 further comprising adding the online summary to the list of the URLs as search results.

5. The method of claim 3 wherein generating the online summary using the plurality of titles of the web pages comprises obtaining each of the plurality of titles of the web pages from a field in a hypertext markup language file.

6. The method of claim 3 wherein generating the online summary using the plurality of titles of the web pages comprises choosing a plurality of terms from the plurality of titles of the web pages.

7. The method of claim 6 wherein choosing the plurality of terms from the plurality of titles of the web pages comprises choosing at least one term that occurs with a frequency greater than a defined threshold in the plurality of titles of the web pages.

8. The method of claim 6 further comprising adding to the plurality of terms at least one term from the plurality of titles of the web pages.

9. The method of claim 8 wherein adding to the plurality of terms the at least one term from the plurality of titles of the web pages comprises adding to the plurality of terms at least one term that is adjacent in the plurality of titles of the web pages to a term in the plurality of terms.

10. The method of claim 6 further comprising merging one overlapping phrase in the plurality of terms from the plurality of titles of the web pages until there may be no more terms that occur in the titles with a frequency that exceeds a predefined threshold.

11. The method of claim 10 wherein merging the at least one overlapping phrase in the plurality of terms from the plurality of titles of the web pages comprises determining the frequency of the position of the occurrence of the phrase in the plurality of titles of the web pages.

12. The method of claim 11 further comprising removing at least one overlapping phrase without a highest frequency of the position of the occurrence of the phrase in the plurality of titles of the web pages.

13. The method of claim 10 further comprising determining whether there are any terms not in the plurality of terms that occur in the plurality of titles of the web pages with a frequency that exceeds a predefined threshold.

14. The method of claim 13 further comprising adding at least one adjacent term in the plurality of titles of web pages that occurs with a frequency that exceeds the predefined threshold to the plurality of terms.

15. The method of claim 14 further comprising merging at least one overlapping phrase in the plurality of terms from the plurality of titles of the web pages.

16. The method of claim 13 further comprising applying a plurality of grammar rules to the plurality of terms and removing at least one term from the plurality of terms.

17. A computer program product comprising computer executable instructions for generating a summary of documents, said instructions causing a computer to perform:
    receiving a search query;
    obtaining a list of URLs of web pages as search results;
    generating an online summary of the list of URLs of web pages using a plurality of titles of the web pages;
    storing the online summary and the list of URLs of web pages as search results;
    merging overlapping phrases until there may be no more terms that occur in titles with a frequency that exceeds a predefined threshold; and
    applying grammar rules for a language in which the information is expressly merging overlapping phrases until there may be no more terms that occur in the titles with a frequency that exceeds a predefined threshold used to remove a term at the beginning or end of a phrase that should not appear in that position of a sentence in the given language.

18. The computer program product of claim 17 wherein generating the online summary using the plurality of titles comprises choosing a plurality of terms from the list of URLs.

19. The computer program product of claim 18 further comprising:
    adding at least one adjacent term in the plurality of titles of the list of URLs that occurs with a frequency that exceeds the predefined threshold to the plurality of terms;
    and removing at least one overlapping phrase in the plurality of terms.

* * * * *